(12) United States Patent
Matteini et al.

(10) Patent No.: US 12,146,229 B2
(45) Date of Patent: Nov. 19, 2024

(54) METHOD AND DEVICE FOR THE ELECTROLYSIS OF WATER

(71) Applicant: NE.M.E.SYS. SRL, Sesto Fiorentino (IT)

(72) Inventors: Marco Matteini, Sesto Fiorentino (IT); Alessandro Tampucci, Sesto Fiorentino (IT); Luca Antonelli, Sesto Fiorentino (IT)

(73) Assignee: NE.M.E.SYS. SRL, Sesto Fiorentino (IT)

( * ) Notice: Subject to any disclaimer, the term of this patent is extended or adjusted under 35 U.S.C. 154(b) by 387 days.

(21) Appl. No.: 17/775,681

(22) PCT Filed: Nov. 19, 2020

(86) PCT No.: PCT/IB2020/060915
§ 371 (c)(1),
(2) Date: May 10, 2022

(87) PCT Pub. No.: WO2021/099986
PCT Pub. Date: May 27, 2021

(65) Prior Publication Data
US 2022/0411938 A1  Dec. 29, 2022

(30) Foreign Application Priority Data

Nov. 21, 2019 (IT) .................. 102019000014703

(51) Int. Cl.
*C25B 1/04* (2021.01)
*C25B 9/63* (2021.01)
(Continued)

(52) U.S. Cl.
CPC .................. *C25B 1/04* (2013.01); *C25B 9/63* (2021.01); *C25B 9/70* (2021.01); *C25B 11/061* (2021.01); *C25B 11/089* (2021.01)

(58) Field of Classification Search
CPC .... C25B 1/04; C25B 9/63; C25B 9/70; C25B 11/042; C25B 11/046; C25B 11/089; C25B 11/075; H01M 4/244
See application file for complete search history.

(56) References Cited

U.S. PATENT DOCUMENTS 8,617,766 B2   12/2013  Bienvenu
10,167,561 B2 *  1/2019  Burtch .................. C25B 11/051
(Continued)

OTHER PUBLICATIONS

International Search Report dated Feb. 24, 2021 issued in PCT International Patent Application No. PCT/IB2020/060915, 2 pp.

*Primary Examiner* — Brian W Cohen
(74) *Attorney, Agent, or Firm* — NIXON & VANDERHYE P.C.

(57) ABSTRACT

An alkaline electrolyser device for hydrogen production includes a first and a second electric charge battery substantially identical. Each electric charge battery has a first electrode of copper, silver or their alloys, coated with zinc, a second electrode with a ferrous catalyst, and an alkaline aqueous solution in which the first and second electrodes are immersed. An output opening placed in correspondence of the second electrode is suitable to allow the escape from the battery of gases which develop in correspondence of the second electrode. The batteries are short-circuited with an electric power supply member placed between the first or the second electrodes, with a predefined polarity such that the voltage across the electrodes is higher than 1.3 V. In this configuration, the first battery undergoes a discharging process producing hydrogen gas, whilst, contextually, the second battery undergoes a charging process generating oxygen gas. When the discharge cycle of the first battery is completed, the polarity of the electric power supply is inverted, so that the second battery begins to discharge producing hydrogen gas and, at the same time, the first battery (Continued)

recharges producing oxygen gas. The polarity inversion is repeated cyclically so that oxygen and hydrogen are produced alternately in the two batteries.

6 Claims, 1 Drawing Sheet

(51) Int. Cl.
*C25B 9/70* (2021.01)
*C25B 11/061* (2021.01)
*C25B 11/089* (2021.01)

(56) References Cited

U.S. PATENT DOCUMENTS

| | | |
|---|---|---|
| 2005/0126924 A1 | 6/2005 | Gomez |
| 2008/0190781 A1* | 8/2008 | Huang ................. C25B 5/00 |
| | | 205/639 |
| 2017/0306510 A1 | 10/2017 | Rothschild et al. |

* cited by examiner

METHOD AND DEVICE FOR THE ELECTROLYSIS OF WATER

This application is the U.S. national phase of International Application No. PCT/IB2020/060915 filed Nov. 19, 2020 which designated the U.S. and claims priority to IT 102019000014703 filed Nov. 21, 2019, the entire contents of each of which are hereby incorporated by reference.

TECHNICAL SECTOR

The present invention discloses a method for the electrolysis of water, in particular to produce hydrogen by electrolysis.

The invention also relates to a device for the electrolysis of water, in particular for the production of hydrogen gas.

STATE OF THE ART

Notoriously, on a commercial scale the production of hydrogen by water electrolysis is strongly limited by the low efficiency of the process compared to other hydrogen production processes, such as steam reforming or other hydrocarbon production methods. However, the advantages of environmental sustainability are driving the search for increasingly efficient electrolysis systems that enable the production of hydrogen by electrolysis to become commercially viable.

An electrolyser consists of a plurality of electrochemical cells connected in series. The electrochemical cell is composed of two semi-elements, also called semi-cells. These semi-elements are kept separate by a semi-permeable membrane. When properly connected through an external electric circuit, the electrons produced by the oxidation reaction, which takes place in one semi-element, are transferred to the other for the reaction of reduction to take place. As a general rule, a semi-element is composed of a metal electrode immersed in an electrolytic medium. In the electrolytic cell, the electrical energy requested to carry out the process is supplied by an external electrical circuit connected to the poles of the cell, thus electrolysis does not occur spontaneously, i.e. the difference in free energy of Gibbs associated with the process is greater than zero. Electrolysis is regulated by Faraday's laws, whose studies have shown that in order for the electrolysis reaction to take place, the minimum voltage across the electrodes of the cell in an electrolyser, working at standard conditions of temperature and pressure (298 K, 1 bar), must be 1.23 V. Under standard conditions of temperature and pressure, below this voltage value between the electrodes of the cell, water electrolysis cannot take place.

Among the electrolysis processes, alkaline electrolysis is one of the most widely known, but which to date shows the lowest efficiency. In alkaline electrolysis, the electrolytic cell is composed by two electrodes immersed in an alkaline liquid electrolyte, consisting of 20-30% by weight of potassium hydroxide (KOH). The two electrodes, conventionally made of nickel-plated steel, are separated by a membrane (in general a positively charged polymer material), which has the function of keeping the gases produced separate, for efficiency and safety reasons. In addition, the membrane must be permeable for hydroxide anions and water molecules.

A process and system for the production of hydrogen from an alkaline aqueous solution are described in US 2017/0306510 A1. This system comprises an electrolytic cell with a working electrode suitable to perform water reduction to generate hydrogen gas following the application of a voltage, as well as a redox-active electrode suitable to undergo reversible reductive and oxidative processes. The working electrode includes carbon, one or more photoactive materials, and/or one or more metals, namely platinum, nickel and stainless steel. When sufficient voltage is supplied to the cell, the working electrode produces hydrogen (charging phase), while oxygen is released in a discharge phase. The redox-active electrode contains a substance that undergoes reversibly oxidation and reduction. Preferably, this substance comprises a transition metal such as Ni, Cu, Zn and/or Cd. However, the transition metal of the active redox electrode does not participate in the oxidation reactions of the redox-active electrode; specifically, such reactions are based on nickel ($NiOOH \rightleftharpoons Ni(OH)_2$) which, likewise, does not pass through the electrolyte and generates relatively unstable reactions. At the redox-active electrode, only hydroxide ions migrate to solution. The double cell system, described in example 3 of the above mentioned document, has an overall reaction potential of 1.7 V but the energy efficiency of the reversible oxidation-reduction reactions described decays very quickly, within a few cell charge and discharge cycles, as described in third example itself. This phenomenon is due to the instability of the reactions that take place at the redox-active electrode, affected by rapid deterioration. For this reason, the possibility of reversing the polarity of the applied current is only envisaged to study the effects of the interchange of charge and discharge cycles on the discharge voltages and on the energy efficiency of the reaction. Nonetheless, given the negative results (−32% discharge capacity in 10 cycles), the document does not even take into consideration the periodic and continuous reversal of polarity as a normal working condition of the pair of cells. Furthermore, the patent clearly describes that, in any case, in the embodiment of example 3, wherein a double cell system is described, the voltage that must be applied between the electrodes of the cells is greater than 1.23V. Lastly, in this patent, the so-called working electrode where oxygen and hydrogen are alternatively generated, which, being made of platinum, is expensive, acts exclusively as a zero potential reference electrode and does not participate in the redox reactions.

From 1980 onwards, studies on solid oxide electrolysis (SOEC) began and this technology has the great advantage of achieving great efficiency, even above 100%, by operating at high pressures and using catalysts made of non-noble material. Moreover, another highly interesting feature of SOEC is that its chemical flexibility and high operating temperature allows it to be used for $CO_2$ to CO electrolysis and equally for the co-electrolysis of $H_2O/CO_2$ to $H_2/CO$ (syngas). Therefore, it undoubtedly represents a technology with great potential for the future production of hydrogen, if the problems related to the durability of ceramic materials at high temperatures and its long-term operation were to be solved.

Solid polymer electrolysis processes are also established. Unlike alkaline electrolysers, PEMs (Polymer Electrolyte Membranes) use a solid electrolyte. Therefore, a polymeric ion exchange membrane replaces the diaphragm: the most commonly explored ones are made of perfluorinated polyethylene with sulfonic lateral groups, such as "Nafion", or carboxylic, such as "Flemion". This membrane shows high proton conductivity, low gas exchange, compact system configuration and high operating pressures (up to 4 MPa). It also shows good performance even at high temperatures of 80-150° C. PEM electrolysers can operate at very high current density values, in fact they can reach values around 2 A/cm² and this reduces operating costs and can potentially reduce the overall costs of electrolysis. However, the production of PEM electrolysers is expensive and this currently minimises the advantages of using them on a commercial scale.

SUMMARY OF THE INVENTION

The main purpose of the present invention is to propose a method for high efficiency alkaline electrolysis.

Another purpose of the present invention is to propose a method for alkaline electrolysis, which enables hydrogen production by operating under standard conditions of temperature and pressure and providing a voltage of less than 1.23 V.

A further purpose of the invention is to propose an alkaline electrolyser with high efficiency.

Another purpose of the invention is to propose an alkaline electrolyser of the type suitable for working under standard pressure and temperature conditions, which is powered with voltages lower than 1.23 V.

According to one aspect of the present invention, the aforementioned purposes are achieved by means of a device for water electrolysis, including:
 a first electrochemical cell, which comprehends:
  a first electrode made of copper, silver or their alloys, coated with zinc, said zinc being alternatively suitable to pass to the solution and deposit on said gaseous electrode following the oxidation-reduction reactions that take place in said cell;
  a second electrode, incorporating a ferrous catalyst, where oxygen gas and hydrogen gas generate alternatively following the oxidation-reduction reactions that take place in said cell;
  an alkaline aqueous solution in which the first and second electrode are immersed;
  an output opening placed in correspondence of said second electrode and intended for the escape of gasses, developing in correspondence of said second electrode, out of the said electrochemical cell;
 a second electrochemical cell substantially identical to said first electrochemical cell;
 means for connecting the first electrodes which electrically short-circuit the first electrodes of said first battery with the first electrodes of said second battery;
 means for connecting the second electrodes which electrically short-circuit the second electrodes of said first battery with the second electrodes of said second battery;
 power supply members associated with said means for connecting the first electrodes, designed to apply only a voltage lower than 1.2 V and having a certain polarity;
 polarity reversing means suitable for reversing the polarity of said power supply members;
 control members configured to periodically act on said means of polarity inversion.

An alkaline electrolyser as outlined above allows the production of hydrogen by supplying electrical energy from outside at a voltage lower than 1.23 V under standard conditions of temperature and pressures.

The electrolysis in alkaline environment ensures particularly high efficiency as the charge voltages of the cells are considerably lower than those in electrolysers operating in acid solution. However, alkaline electrolysis also offers additional advantages. First, catalysts are cheaper than catalysts based on platinum metal groups exploited in acidic environments. Furthermore, alkaline electrolysis warrants a longer cell life due to the presence of an interchangeable electrolyte and a lower dissolution of the anodic catalyst. Finally, it also guarantees a greater purity of the gas produced thanks to the lower diffusivity of the gas in the alkaline electrolyte.

On the other hand, the alkaline cells of the known technique require anionic membranes, which offer poorer performances than the cationic "Nafion" based membranes, used in solid electrolysis. Thus, the technological problem with such membranes very often implies that they do not operate in an alkaline environment despite the advantages mentioned above. The present invention permits to overcome these limits by virtue of the use of a double half-cell system that does not require a membrane.

According to another aspect of the present invention, the aforementioned purposes are achieved by means of a method for the electrolysis of water, comprising phases of:
 arranging a first and a second substantially identical electric charge batteries, each including:
  a first electrode consisting of copper, silver or their alloys, coated with zinc;
  second electrode comprising a ferrous catalyst;
  an alkaline aqueous solution in which the first and second electrodes are immersed;
 such batteries having a voltage across the electrodes not exceeding 1.2 V when fully charged, and in particular with the first battery in fully charged configuration, and the second arranged in fully discharged condition;
 setting in short-circuit the first and second batteries with an electric power supply member interposed between them. Specifically, the power supply member is configured to supply a voltage not exceeding 1.2 V, with a predefined polarity such that the voltage between the electrodes of said batteries is greater than 1.3 V. Accordingly, when the first battery begins to discharge and, contextually, produces hydrogen gas at the corresponding second catalyst electrode, removed in turn through the relative output opening, the second battery begins to charge producing oxygen gas at the corresponding second electrode, which is concomitantly removed through the relative output opening;
 inversion of the polarity of said electric power supply when the first battery reaches a discharge condition and the latter reaches a charge condition. In such a way, the second battery begins to discharge producing gaseous hydrogen in correspondence of the relative second catalyst electrode, which is extracted through the relative output opening, and, at the same time, the first battery begins to charge producing gaseous oxygen at the relative second electrode, which is extracted through the relative output opening;
 periodic repetition of the polarity inversion of the electric power supply by selectively and alternately capturing oxygen and hydrogen from said second electrodes of both the batteries through the respective output openings.

The electrolysis method according to the invention enables the production of hydrogen by applying an external voltage lower than 1.23 V. Accordingly, thanks to the use of a pair of electrochemical cells which are, contextually, batteries and electrolytic cells, the voltage across the electrodes of the charged cell is added to the voltage of an external generator to provide sufficient voltage for the electrolysis to take place.

BRIEF DESCRIPTION OF THE DRAWINGS

These and other features and advantages of the invention will emerge more clearly on reading the detailed description of exemplary embodiments of the invention, given by way of non limiting example and with reference to the following figures, in which.

DETAILED DESCRIPTION OF PREFERRED EMBODIMENTS

Figure 1:
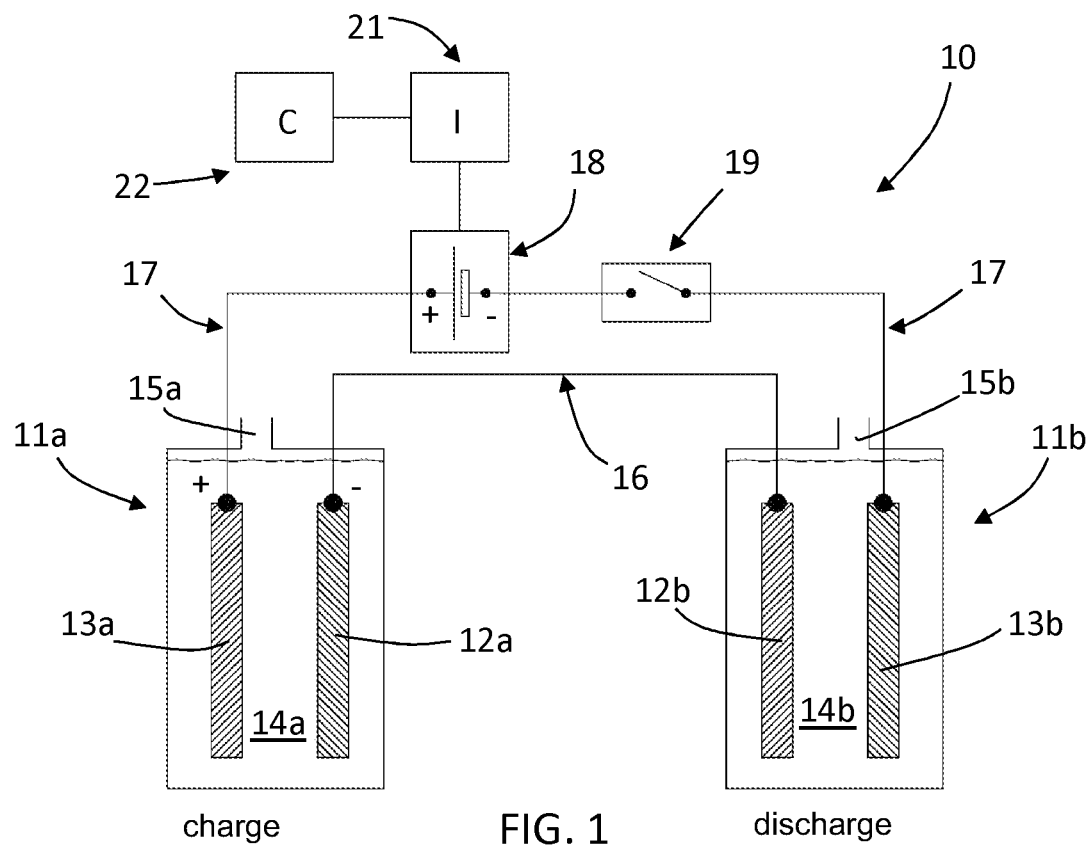
FIG. 1 shows a block diagram of an electrolyser devise according to the present invention.
Figure 2:
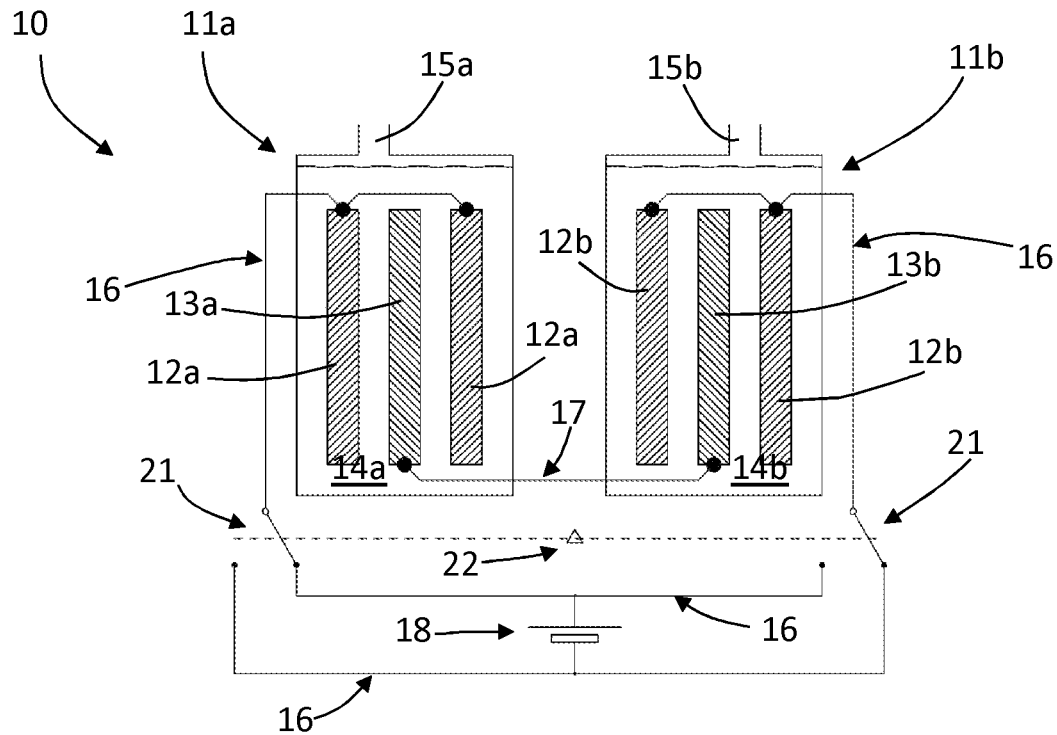
FIG. 2 shows in schematic form the device of FIG. 1 in which a possible way of preparing the electrical connections is highlighted.

With reference to FIGS. 1 and 2, the number 10 generally indicates an electrolyser device according to the present invention. The device 10 includes a first electric battery, 11a, and a second electric battery, 11b, substantially identical.

Referring to FIG. 1, the batteries 11a and 11b are shown in a schematic form, emphasizing the essential elements of one of the electrochemical cells, which constitute them, whereas FIG. 2 illustrates an advantageous arrangement of electrical connection between the electrodes in the corresponding electrochemical cells. One of the above-mentioned electrochemical cells is substantially constituted by first zinc coated electrodes, 12a, 12b, made of copper, silver or their alloys, by second electrodes, 13a, 13b, which incorporate a ferrous catalyst on a microporous material support, and an alkaline aqueous solution 14a, 14b. The alkaline aqueous solution may contain at least one of potassium hydroxide, sodium hydroxide, lithium hydroxide, and cesium hydroxide. In some embodiments, the alkaline aqueous solution 14a, 14b consists in particular of water in which a certain quantity of potassium hydroxide (KOH) is dissolved, preferably between 20% and 30% by weight. Both batteries 11a, 11b, also present an output opening, 15a, 15b, intended to allow the outflow of gases that develop in correspondence of the second electrodes 13a, 13b, of the corresponding electrochemical cells.

The first electrodes 12a of the first battery 11a and the first electrodes 12b of the second battery 11b are electrically short-circuited by means of the first connecting means, 16; whereas, the second electrodes 13a of the first battery 11a and the second electrodes 13b of the second battery 11b are electrically short-circuited through second connecting means, 17. Herein, the term 'electrically short-circuited' refers to a specific type of electrical connection whose electrical resistance has negligible values with respect to the overall resistance of the circuit, such as that obtained by means of a simple copper cable or other material with conductivity of the same order of magnitude. Hence, the two batteries 11a, 11b are electrically connected to each other in closed circuit, and in short circuit. With reference to FIG. 1, direct current power supply members, 18, are associated to the second connecting means 17 to supply a voltage lower than 1.2 V between the second electrodes 13a, 13b, and with a certain polarity. Alternatively, as shown in FIG. 2, power supply members 18 can be associated to the second connecting means 16 or even (variant not shown in the figures) to both connecting means 16, 17, in such a way that the power supply members 18 supply a voltage not exceeding 1.2 V. Current switches, 19, are advantageously associated with the second connecting means 17, or the first connecting means 16, to selectively open or close the circuit between the two batteries 11a, 11b. Polarity reversing means, 21, are associated with the power supply members 18 and suitable for reversing the polarity of the latter. Moreover, control members, 22, are envisaged and configured to periodically actuate the polarity reversing means 21, so that the voltage supplied by the power supply members 18 to the circuit is periodically reversed.

The operating method of the electrolyser device 10, described above, is carried out as follows. Referring to FIG. 1, the first battery 11a is arranged in fully charged condition, with the first electrode 12a constituting the negative electrode and the second electrode 13a constituting a positive electrode with a voltage across them of about 0.8 V, nevertheless between 0.5 V and 1.2 V. The second battery 11b is in a discharged condition. When the circuit is closed, by means of current switches 19, the power supply members 18 are arranged with such a polarity that the relative negative pole is connected to the second electrode 13a of the first battery 11a and the corresponding positive pole is connected to the second electrode 13b of the second battery 11b. Therefore, the circuit is supplied with an additional voltage of about 0.8 V, and anyhow in a range of from 0.5 V to 1.2 V. In these conditions, at the ends of the first and second batteries 11a, 11b, the voltage is about 1.6 V, nevertheless higher than 1.23V, and chemical reactions take place in them that would not occur spontaneously, i.e. in the absence of a voltage at the ends of the electrodes higher than 1.23V. In particular, the first battery 11a undergoes the discharging process and the second battery 11b undergoes the charging process. In further detail, in the first battery 11a during the discharging, the zinc coating of the first electrode 12a migrates into solution in the electrolyte and forms potassium tetrahydroxozincate ($Zn(OH)_4K$), while at the second electrode 13a (catalyst) hydrogen gas ($H_2(g)$) is released from the output opening 15a. At the same time, in the second battery 11b, during the charging process, the zinc in the form of potassium tetrahydroxozincate in the electrolyte is deposited in the form of Zinc metal on the first electrode 12b, whereas at the second electrode 13b (catalyst) gaseous oxygen ($O_2(g)$) is released from the output opening 15b.

When the discharging cycle of the first battery 11a is complete, the second battery 11b has completed the charging cycle. At this point, the control units 22, preferably in a time-controlled way, operate the polarity inversing means 21 and the polarity of the power supply members 18 is reversed so that the second battery 11b starts the discharging cycle while the first battery 11a starts the charging cycle. In further detail, in the second battery 11b, during the discharging phase, the zinc metal coating the first electrode 12b passes into solution in the electrolyte and forms potassium tetrahydroxozincate ($Zn(OH)_4K$), while at the second electrode 13b (catalyst) hydrogen gas ($H_2(g)$) is released from the output opening 15b. At the same time, in the first battery 11a, during the charging phase, the zinc present in the form of potassium tetrahydroxozincate in the electrolyte is deposited on the first electrode 12a, while at the second electrode 13a (catalyst) gaseous oxygen ($O_2(g)$) is released from the output opening 15a.

At this point, the electrolyser device 10 has performed a complete cycle with the first battery 11a which is again in the initial fully charged condition and the second battery 11b which is in the initial discharged condition. During the first half of the cycle, the first battery 11a produced hydrogen and the second battery 11b produced oxygen, whilst in the second half of the cycle, after the polarity inversion, the first battery 11a produced oxygen and the second battery 11b produced hydrogen. In both batteries 11a, 11b water consumption from the electrolyte occurs. From a chemical point of view, in batteries 11a, 11b, during the discharging phase the zinc metal is oxidized:

$$Zn(s)+4H_2O=[Zn(OH)_4]^{2-}+2H_2\uparrow-2e$$

$$Zn(s)\rightarrow Zn^{2+}+2e$$

Whereas during the charging phase the following reactions take place:

$$[Zn(OH)_4]^{2+}+2e=Zn+2H_2O+O_2\uparrow$$

$$Zn^{2+}+4e-\rightarrow 2Zn(s).$$

Since both gaseous hydrogen and oxygen develop at the second electrode, 13a, 13b, in two consecutive half-cycles, they outflow from the same output opening 15a, 15b. Advantageously, collection organs for the gasses escaping from the output openings provide suitable purging systems to prevent the hydrogen gas and oxygen gas from mixing in the collection organs.

From a structural point of view, in an alkaline electrolyser, according to the present invention, batteries 11a and 11b can have electrochemical cells arranged in either monopolar or bipolar configuration. Furthermore, since both hydrogen and oxygen are produced in correspondence of the same electrode (the second electrode 13a, 13b), it is not necessary to use a diaphragm between the electrodes with the function of keeping the produced gases separate. However, it is possible to design a diaphragm to prevent the diffusion of gases towards the first electrode 12a, 12b. Advantageously, higher efficiency is obtained by using as a second electrode a microporous nickel support, coated with a paste consisting of iron and nickel powder, able to pass through and fill the micropores of the support, in a binder, preferably Teflon.

An electrolyser device as described above allows actuating a method of production of hydrogen by electrolysis according to the present invention.

According to the invention, the method encompasses the steps of setting a suitable device and conducting it for obtaining the production of hydrogen by electrolysis with high efficiency thanks to an extremely low external energy input. More specifically, and again with reference to FIG. 1, the method of the invention entails the preparation of a first 11a and a second electric charge battery 11b substantially identical, each one comprising:

- a first electrode 12a, 12b made of copper, silver or their alloys, coated with zinc;
- a second electrode 13a, 13b comprising a ferrous catalyst;
- an alkaline aqueous solution 14a, 14b in which the first and second electrodes are immersed;
- an output opening 15a, 15b, placed in correspondence of said second electrode 13a, 13b and intended to allow the outflow from the battery of the gases which develop in correspondence of said second electrode.

The batteries 11a, 11b are configured to have a voltage across the electrodes of about 0.8 V, and anyhow in a range of from 0.5 V to 1.2 V in fully charged conditions. The first battery 11a is set up in fully charged status, whilst the second battery 11b is set up in fully discharged status.

The first and second batteries 11a, 11b are electrically short-circuited with a power supply member 18 between the first (or second) electrodes 12a, 12b. The above mentioned electric power supply member 18 is configured to supply a voltage of about 0.8 V, and nevertheless in a range of from 0.5 V to 1.2 V with a predefined polarity. In such a way, the voltage generated by the power supply member 18 is added to the voltage between the electrodes of the previously mentioned first fully charged battery 11a, so that the voltage between the electrodes of said batteries is higher than 1.3 V. In this manner, the first battery 11a undergoes the discharging process, producing gaseous hydrogen in proximity of the relative second catalyst electrode 13a, which is, in turn, extracted through the corresponding output opening 15a. Contextually, the second battery 11b begins to charge, producing gaseous oxygen in proximity of the corresponding second electrode 13b, which escapes through the corresponding output opening 15b.

When the discharging of the first battery 11a and simultaneous charging of the second battery 11b are completed, preferably after a pre-set time interval, the polarity of said power supply member 18 is reversed. Hence, the second battery 11b begins to discharge, causing the generation of gaseous hydrogen, at the corresponding second catalyst electrode 13b, which is extracted through the corresponding output opening 15b. At the same time, the first battery 11a begins to charge producing gaseous oxygen in correspondence of the relative second electrode 13a, which outflows through the relative output opening 15a.

When both the discharging of the second battery 11b and recharging of the first battery 11a are complete, the polarity of the electric power supply member 18 is reversed again and such polarity inversion is repeated cyclically by selectively and alternately collecting oxygen and hydrogen from the second electrodes 13a, 13b of each of first and second batteries 11a, 11b.

As can be easily understood, the method above illustrated allows the electrolysis process with hydrogen and oxygen production to occur with a very low external power supply by virtue of the very low voltage, about 0.8 V, needed by the power supply.

The advantages set forth above of the described embodiments of an alkaline electrolyser device for the production of hydrogen and its method for the production of hydrogen by alkaline hydrolysis according to the present invention remain preserved even in the presence of variants and embodiments. As far as the device of the invention is concerned, it must certainly be understood that what is herein described concerns the general scheme and principle of operation and that numerous forms of practical application can be envisaged for implementing the constructive principle described. Accordingly, what has been described and represented is only by way of example, not limiting the constructive concept, so that an electrolyser device according to the present invention and a relative method of alkaline electrolysis for the production of hydrogen may entail further modifications and practical variants, while remaining within the scope of protection of the appended claims.

The invention claimed is:
1. A water electrolysis device comprising:
   a first battery composed of one or more electrochemical cells, each electrochemical cell including:
   a first electrode made of copper, silver or their alloys, coated with zinc, said zinc being alternatively able to migrate into solution and deposit on said first electrode following redox reactions that take place in said electrochemical cell;
   a second electrode comprising a ferrous catalyst, where oxygen gas and hydrogen gas develop alternately following the redox reactions that take place in said electrochemical cell;
   an alkaline aqueous solution in which said first and second electrode are immersed;
   said first battery comprising at least one output opening suitable for allowing the escape from said first battery gases produced in correspondence with said second electrode of the relative electrochemical cells;

a second battery identical to said first battery;

means for connecting the first electrodes which electrically short-circuit the first electrodes of said first battery with the first electrodes of said second battery;

means for connecting the second electrodes which electrically short-circuit the second electrodes of said first battery with the second electrodes of said second battery;

DC power supply members associated with said connection means of the first or second electrodes, said power supply members being able to apply only a voltage lower than 1.2 V and having a certain polarity;

polarity reversing means suitable for reversing the polarity of said power supply members;

control members configured to periodically operate said polarity reversing means.

2. The water electrolysis device according to claim 1 wherein said alkaline aqueous solution contains at least one of potassium hydroxide, sodium hydroxide, lithium hydroxide, cesium hydroxide).

3. The water electrolysis device according to claim 1 wherein said second catalyst electrode consists of a support in microporous material made of nickel impregnated with a paste consisting of iron and nickel powders in a binder.

4. The water electrolysis device according to claim 1 wherein said first and second batteries are suitable for generating a voltage between the relative electrodes of less than 1.2 V when they are fully charged.

5. A water electrolysis method comprising phases of:

arranging identical first and second electric batteries, each battery comprising:

a first electrode made of copper, silver or their alloys, coated with zinc;

a second electrode comprising a ferrous catalyst;

an alkaline aqueous solution in which said first and second electrodes are immersed;

an output opening placed in correspondence with said second electrode and suitable for allowing the escape from said battery of gases produced at said second electrode;

said batteries having voltage between the electrodes not higher than 1.2 V in a fully charged condition, said first battery being set up in a fully charged condition, said second battery being set up in a completely discharged condition;

shorting said first and second batteries together with an electric power supply interposed between said first or said second electrodes, said electric power supply being configured to supply a voltage not higher than 1.2 V with a predefined polarity such that the voltage between the electrodes of said batteries is higher than 1.3 V, so that said first battery begins to discharge producing hydrogen gas at its second electrode which is taken from its output opening and at the same time said second battery begins to charge producing gaseous oxygen at its second electrode which is taken from its output opening;

inverting the polarity of said electric power supply when said first battery reaches a discharge condition and said second battery reaches a charge condition, so that said second battery begins to discharge producing hydrogen gas at its second electrode which is taken from its channel extraction and at the same time said first battery begins to charge producing gaseous oxygen at its second electrode which is taken from its output opening;

periodically repeating the polarity inversion of said electric power supply by selectively and alternately taking oxygen and hydrogen from said second electrodes of each of said first and second batteries from the respective output openings.

6. The method for electrolysis of water according to claim 5 wherein between a phase of taking oxygen and a phase taking hydrogen from each of said second electrodes, a purge phase is performed where said output openings are purged.

* * * * *